United States Patent [19]

Klauber et al.

[11] Patent Number: 4,979,399
[45] Date of Patent: Dec. 25, 1990

[54] SIGNAL DIVIDING MAGNETOSTRICTIVE TORQUE SENSOR

[75] Inventors: Robert D. Klauber; Erik B. Vigmostad, both of Fairfield, Iowa

[73] Assignee: SensorTech L.P., Fairfield, Iowa

[21] Appl. No.: 511,088

[22] Filed: Apr. 18, 1990

Related U.S. Application Data

[62] Division of Ser. No. 222,838, Jul. 21, 1988, Pat. No. 4,939,937.

[51] Int. Cl.$^5$ .............................................. G01L 3/10
[52] U.S. Cl. .................................................. 73/862.36
[58] Field of Search ............... 73/862.36, 779, DIG. 2; 324/209

[56] References Cited

U.S. PATENT DOCUMENTS

| | | | |
|---|---|---|---|
| 2,912,642 | 11/1959 | Dahle | 324/34 |
| 3,011,340 | 12/1961 | Dahle | 73/136 |
| 3,340,729 | 9/1967 | Scoppe | 73/136 |
| 4,414,856 | 11/1983 | Winterhoff | 73/862.36 |
| 4,572,005 | 2/1986 | Kita | 73/862.36 |
| 4,589,290 | 5/1986 | Sugiyama et al. | 73/862.36 |
| 4,697,459 | 10/1987 | Nonomura et al. | 73/862.36 |
| 4,697,460 | 10/1987 | Sugiyama et al. | 73/862.36 |
| 4,750,371 | 6/1988 | Kobayashi et al. | 73/862.36 |

OTHER PUBLICATIONS

Monomura et al. JAE Paper #870472, *Sensors and Activators*, 1987 SP693, "Measurements of Engine Torque with Infra-Bearing Torque Sensor", Feb. 1987.

Dahle, O., ASEA Four 1960, vol. 33, No. 3, pp. 23-32, "The Ring Torductor-A Torque Gauge Without Slip Rings for Indust. Meas. and Control".

Beth, R. A. and Meeks, W. W. Rev Sci Instrum., vol. 25, No. 6 1954, pp. 603-607, "Measurement of Torque in a Rotating Shaft".

*Primary Examiner*—Charles A. Ruehl
*Attorney, Agent, or Firm*—Bell, Seltzer, Park & Gibson

[57] ABSTRACT

A noncontacting method for sensing torque based on the principle of magnetostriction comprises inducing a primary magnetic flux in a shaft (20) via such means as a primary excitation core/coil (30/32), utilizing a secondary core/coil (34/36), and an auxiliary core/coil (48/50), and dividing a secondary signal obtained from the secondary core/coil (34/36) by a signal obtained from the auxiliary core/coil (48/50) to obtain a torque dependent signal. Signal dependence on RPM, temperature, inhomogeneity of shaft permeability magnitude, and air gap is thereby minimized. Another embodiment employs a plurality of sensors (66A/66B) strategically located around the shaft (20) to eliminate spurious signals which are due to bending stress and shaft misalignment.

12 Claims, 7 Drawing Sheets

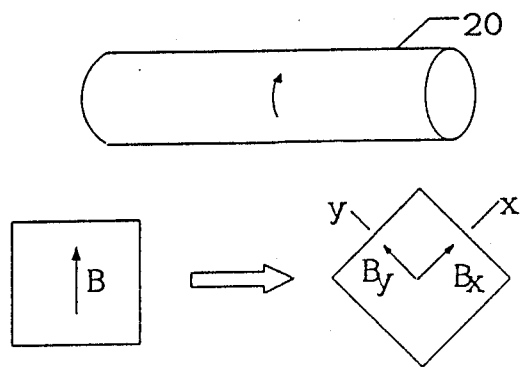
FIGURE 1A
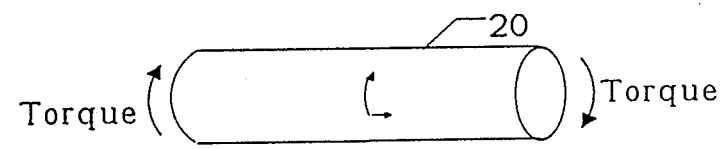
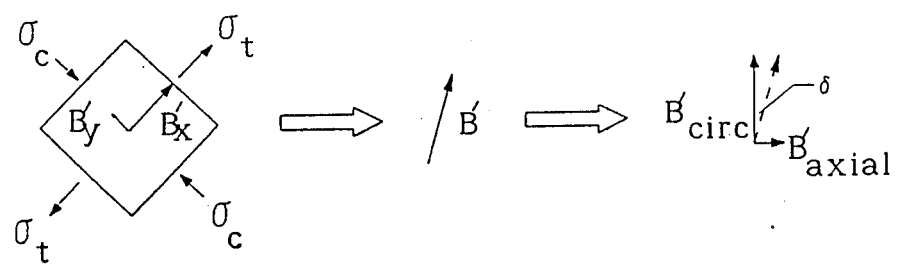
FIGURE 1B

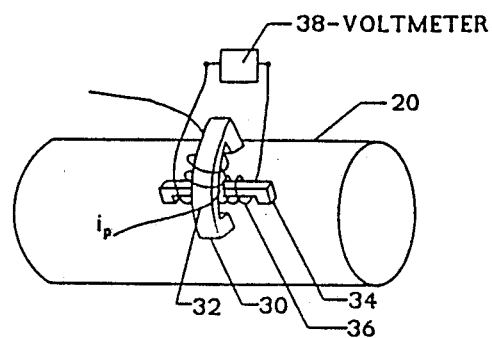
FIGURE 2A: PRIOR ART
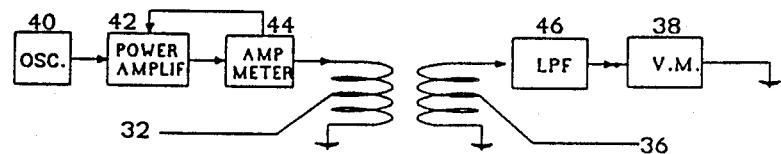
FIGURE 2B: PRIOR ART

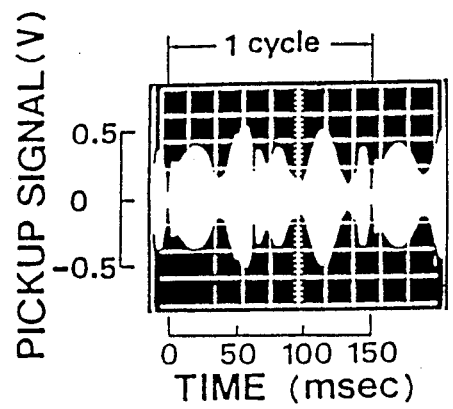
FIGURE 3: PRIOR ART

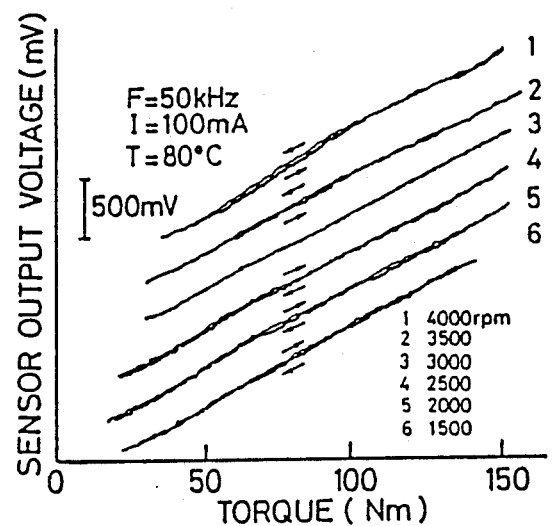
FIGURE 4: PRIOR ART

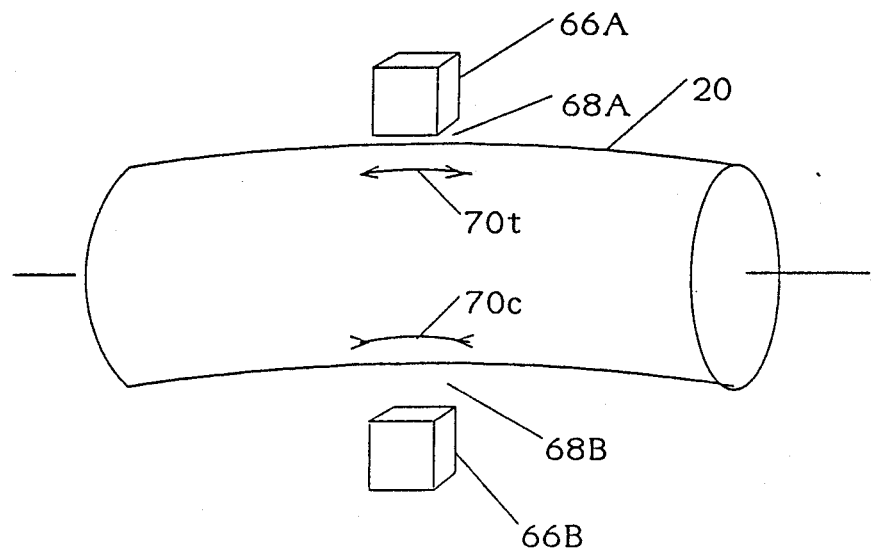
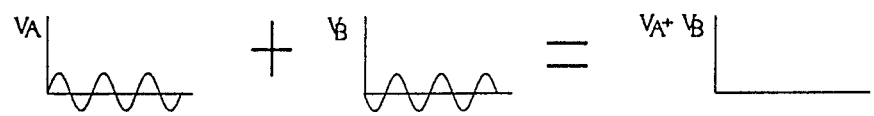
FIGURE 7

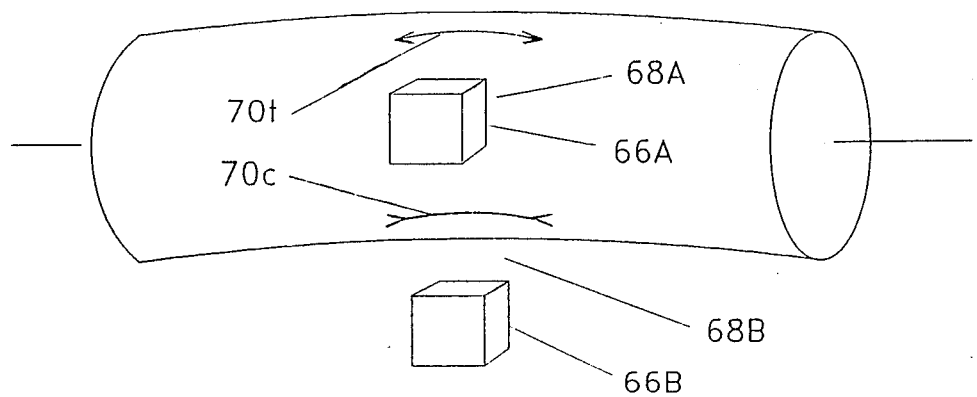
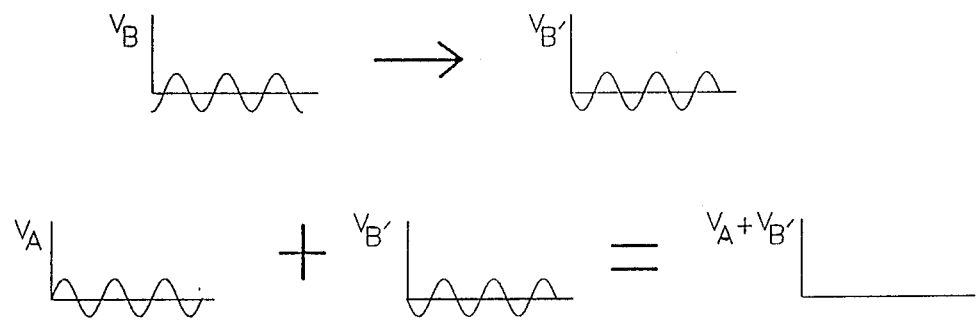
FIGURE 8

SIGNAL DIVIDING MAGNETOSTRICTIVE TORQUE SENSOR

BACKGROUND OF THE INVENTION

1. Cross Reference to Related Application

This application is a divisional of U.S. application Ser. No. 07/222,838 filed July 21, 1988, now Patent No. 4,939,937.

2. Field of the Invention

This invention relates to a torque sensor based on the principle of magnetostriction, and more particularly, to an improved magnetostrictive torque sensor which is simpler, more accurate, and more economical than state of the art sensors as well as more suitable to mass production and usage.

3. Description of Prior Art

Engineers and scientists have sought a simple, reliable, accurate means for measuring torque in rotating shafts for well over a century. Applications for such a torque measuring apparatus include diagnosis, prognosis, and load level monitoring of a vast number of different types of rotary drive mechanisms such as automotive, ship, and plane engines; motors and generators of all types; oil drilling rigs; rotating machining tools; all electric power steering; robotics; and much more.

Further, measurement of mechanical power produced by an engine (or used by a generator) cannot be made without knowing both torque and rotational speed of the shaft. Hence there has heretofore been no ready means to determine on-line power and efficiency of rotary drive devices simply, accurately, and reliably. This has proven to be problematic in many areas of modern technology, but it has been particularly troublesome in attempts to develop modern automotive engine control systems which would improve fuel efficiency and optimize engine performance.

Heretofore several methods have been developed for measuring torque in rotating shafts (see below), but none has been ideal. That is, no single presently known method offers all of the following desirable properties: contact free (no slip rings, etc.), reliable (low failure rate), accurate, small and unobtrusive (requiring little shaft/engine re-work), inexpensive, applicable at high as well as low speeds, instantaneous torque measurement (not merely mean torque over several revolutions), and amenable to mass production (not restricted to special test apparatus).

There are presently only four distinct methods for measuring torque directly in a rotating shaft. They are:
1. Twist angle of shaft measurement
2. Strain gauge sensor
3. Reaction force measurement
4. Magnetostrictive sensors The twist angle method involves measurement of the angle of twist of a shaft and correlates this, using the material and dimensional characteristics of the shaft, to torque. It entails a complicated and cumbersome mechanism with low sensitivity, calibration difficulties, and the necessity of using two different locations along the shaft. In automotive applications it invariably entails extensive engine modification, a costly endeavor.

The strain gauge approach requires bonding of strain gauges to the shaft surface and relating strain measurement to torque. It is limited to low speed, is not amenable to mass production, lacks durability, and needs some means such as slip rings and brushes to bring the signal off of the shaft.

Reaction force measurement utilizes Newton's second law for rotational motion to relate force and motion of the engine mounts to shaft torque. The method must employ a large structure, has low sensitivity, is not feasible for production runs, and measures driveline, not engine, torque.

Magnetostrictive torque sensors take advantage of the magnetostrictive property of ferromagnetic materials whereby tension stress increases (and compressive stress decreases) a given magnetic induction field (i.e., the "B" field) carried by the material. A coil of wire of arbitrary number of turns wrapped around an iron core is placed close to the shaft and an electric current passing through the wire causes a magnetic field to be induced in the rotating shaft. In magnetostrictive sensor designs such as those described in U.S. Pat. Nos. 2,912,642 and 4,589,290 a second coil of arbitrary number of turns wrapped around a second iron core is then placed close to the shaft and used to measure the change in the induction (the B field) which results from the increased surface stress caused by the applied torque.

The magnetostrictive method has several advantages over the other three methods, including: non-contact (no slip rings), not restricted to low speeds, measures torque of engine directly, high sensitivity, economical, simple structure: no strain gauges, no large apparata, only one location anywhere on shaft; little engine re-work, durable and reliable (no moving parts to cause mechanical failure, resistant to high pressure and temperature of engine environment), unobtrusive (cross design type of U.S. Pat. Nos. 2,912,642 and 4,589,290 can be readily miniaturized.)

However, magnetostrictive torque sensors of the cross type design have heretofore been plagued with several major problems which have prevented any of them from becoming the standard in the field. These are (1) Output signal varies with RPM even at constant torque.
(2) Output signal varies with temperature.
(3) Spurious signal variation within one mechanical cycle (one revolution of shaft) prohibits accurate instantaneous measurement of torque: only average values over several shaft revolutions are possible.
(4) Correction methodologies such as those described in U.S. Pat. Nos. 4,589,290 and 4,697,459 and SAE paper #870472 heretofore employed for problems (1) to (3) above have not been able to reduce inaccuracies to acceptable levels.
(5) All such correction methodologies developed to date involve complicated and extensive electronic circuitry and/or additional sensors for temperature and RPM.
(6) Additionally, all such correction methodologies utilized to date are affected by subtle individual shaft material and property variations such as residual stress, slight inhomogeneity in shaft magnetic properties, shaft tolerances/misalignment, and shaft bending stress. Hence such methodologies must be tailored specifically for each individual shaft and therefore are not suitable for mass production.
(7) Furthermore, such correction methodologies have to be re-calibrated repeatedly over the lifetime of the shaft, since residual stress values, tolerances, misalignments, bending stresses, and even magnetic property inhomogeneities change over time (particularly in high temperature environments such as those of automobile engines.) Recalibration for mechanisms such as automobile engines is so difficult as to render such correction methodologies impractical.

OBJECTS AND ADVANTAGES OF THIS INVENTION

Accordingly, several general objects and advantages of this magnetostrictive torque sensor invention over prior art are considerable improvement in accuracy, simplicity of design, lowered cost, suitability for mass production, and practically for continued usage. Such general objects and advantages are achieved by the following specific objects and advantages: reduction of signal dependence on shaft rotation speed; reduction of signal dependence on temperature; reduction of signal variations within a single shaft revolution due to shaft magnetic property inhomogeneities; elimination of signal variations due to bending stress, shaft misalignment, and tolerance variations; instantaneous measurement of torque; elimination of signal dependence on individual shaft variations in permeability magnitude and hence improved suitability for mass production; elimination of need to recalibrate sensing device during course of shaft lifetime; simple effective signal processing circuitry and sensor orientation permitting the above advantages.

Further objects and advantages of the invention will become apparent from a consideration of the drawings and ensuing description of it.

SUMMARY OF THE INVENTION

This magnetostrictive torque sensor invention solves many of the problems associated with prior art through heretofore unrealized insight into the fundamental electromechanical principles underlying previous experimental results and by using that insight to devise a superior design solution.

In prior art a coil of wire with current flowing through it induces a primary magnetic induction field (B field) in a ferromagnetic shaft which is located close to the coil. If the shaft is not moving, a constant amplitude AC current in the wire will produce a constant amplitude magnetic flux in the shaft where the flux amplitude depends on the magnetic permeability of the shaft material. As torque is applied to the shaft, the shaft experiences torsional stress as a result of the applied torque. Through the phenomenon of magnetostriction, a secondary magnetic induction field component arises at an angle to the primary field direction and the magnitude of that second magnetic field flux is dependent on the amount of torque applied to the shaft. The secondary flux is measured via Faraday's law by placing a second coil close to the shaft aligned in the direction of the secondary magnetic field and then measuring the voltage across the second coil. The voltage across the second coil is therefore a direct indicator of torque. The procedure is accurate under ideal conditions when the primary field flux could be maintained constant.

If the shaft is turning, however, and if the shaft has local variations in permeability around its circumference (true of virtually all shafts), then the flux amplitude in the shaft is not constant and varies as the shaft turns.

A different shaft, with different permeability, will also result in different primary magnetic flux, yielding a different voltage across the secondary coil, and hence prohibiting use of the sensor on a mass production scale.

This problem is solved in the present invention by using an auxiliary coil (i.e., a third coil) to measure the primary magnetic flux via Faraday's law. The secondary coil voltage is divided by the auxiliary coil voltage to obtain a resultant signal. The second coil voltage varies with RPM, shaft permeability magnitude, and torque whereas the auxiliary coil voltage varies with RPM and shaft permeability magnitude, but not torque. Hence the resultant signal after division has reduced dependence on spurious signal sources and is a more accurate indication of torque.

Another embodiment employs two or more magnetostrictive torque sensors such as that of embodiment one and places said sensors strategically around the shaft such that a resultant signal produced by combining signals of the individual sensors is free of erroneous signal components resulting from bending or misalignment of the shaft.

The invention, in its various embodiments, solves many of the problems associated with prior art discussed in the "Description of Prior Art" section in a superior and wholly satisfactory manner.

BRIEF DESCRIPTION OF THE DRAWINGS

Drawings Illustrating Prior Art

FIGS. 1A and 1B depict the behavior of an induced magnetic field B in a shaft undergoing applied torque. FIG. 1A depicts the zero torque state; FIG. 1B the state with applied torque.

FIGS. 2A and 2B show the standard prior art configuration magnetostrictive torque sensor. FIG. 2A depicts the physical arrangement of the primary and secondary coil/cores; FIG. 2B depicts the signal processor circuit block diagram.

Drawings Illustrating Problems and Limitations of Prior Art

FIG. 3 is a reproduction from SAE paper #870472 showing the signal variation in output signal with constant torque over one mechanical cycle which is typical of prior art configurations.

FIG. 4 is also a reproduction from SAE paper #870472 and shows the variation in output signal with shaft rotation speed which is found in prior art configurations.

Drawings Illustrating the Present Invention

Figure 5:
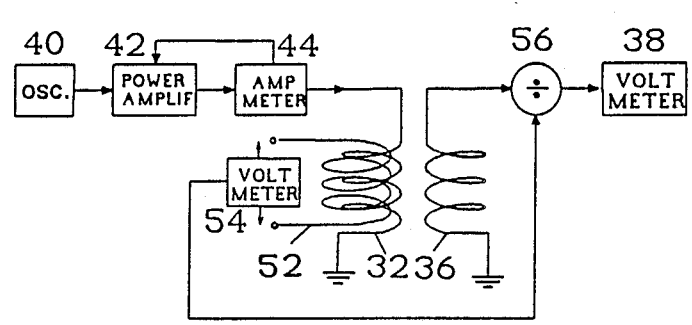

FIG. 5 depicts the signal processor block diagram representing one of embodiment of the present invention.

Figure 6:
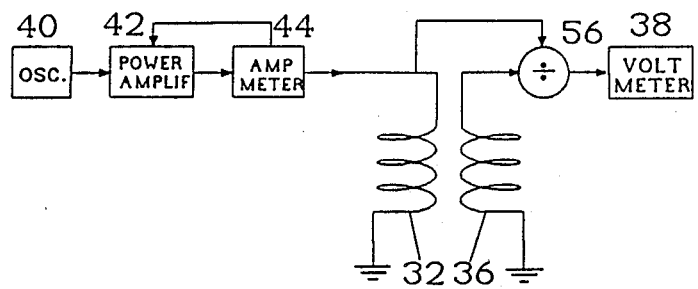

FIG. 6 shows a second embodiment of the present invention in which coil resistance is negligible.

FIG. 7 depicts a third embodiment of the present invention, comprising a multiplicity of magnetostrictive torque sensors strategically located such that the sum of the voltages produced by each sensor is a signal which is effectively free of misalignment and bending stress induced signals.

FIG. 8 depicts a fourth embodiment of the present invention, comprising a multiplicity of magnetostrictive torque sensors strategically located such that the sum of the phase shifted voltages produced by said sensors is a signal which is effectively free of misalignment and bending stress induced signals.

DRAWING REFERENCE NUMBERS 20 rotating shaft
30 primary core
32 primary coil
34 secondary (pickup) core 36 secondary (pickup) coil
38 voltmeter measuring output of secondary coil
40 oscillator
42 power amplifier
44 amp meter
46 low pass filter
52 auxiliary coil (on primary core) for embodiment number two
54 auxiliary coil voltmeter for embodiment number two
56 signal divider
66A magnetostrictive sensor A
66B magnetostrictive sensor B
68A air gap between sensor A (item 66A) and shaft (item 20)
68B air gap between sensor B (item 66B) and shaft (item 20)
70c bending compressive stress
70t bending tensile stress

PRINCIPLES AND ANALYSIS OF MAGNETOSTRICTIVE TORQUE SENSORS

Conceptual Overview

FIGS. 1A and 1B show the effect on an induced magnetic field (also called induction) B in a shaft 20 when torque is applied to the shaft 20. FIG. 1A depicts the shaft 20 with zero torque applied and the induction B directed circumferentially. The induction B can also be represented in terms of two components $B_x$ and $B_y$ at 45° angles to the circumferential direction.

FIG. 1B illustrates the change in the induction B when torque is applied. The torque creates tensile stress $\sigma_t$ in the direction of the induction component $B_x$, and compressive stress $\sigma_c$ in the direction of the induction component $B_y$. Due to the principle of magnetostriction, induction component $B_x$ increases in magnitude to $B'_x$; and induction component $B_y$ decreases in magnitude to $B'_y$. The induction components and can then be added vectorially to obtain the induction with torque applied B'. The induction B' makes an angle $\delta$ with respect to the original induction B, and can then be represented in terms of two components $B'_{circ}$ and $B'_{axial}$ directed along the circumferential and axial directions respectively. Therefore, $$B'_{circ} = B'\cos\delta$$

$$B'_{axial} = '\sin\delta.$$

The angle $\delta$ is in practice quite small, hence
$$B'_{circ} \approx B' \approx B$$

$$B'_{axial} \approx B'\delta \approx B\delta.$$

The magnitude of $B'_{axial}$ increases with increasing applied torque and equals zero when torque equals zero.

FIGS. 2A and 2B depict the standard prior art configuration for inducing the magnetic induction B and for measuring the induced axial induction $B'_{axial}$. FIG. 2A shows the primary coil 32 carrying current, typically AC, wrapped around the primary ferromagnetic U shaped core 30 in which the core 30 is aligned circumferentially to shaft 20 and in which the ends of the core 30 are shaped and placed such that a constant width air gap exists between the core 30 and the shaft 20. The current in primary coil 32 causes a magnetic flux to be carried through primary core 30 across the air gaps and along the surface of shaft 20 in a manner similar to that depicted in FIGS. 1A and 1B.

Secondary coil 36 is typically open circuit and is wound around secondary U shaped core 34 which is aligned in the axial direction of shaft 20 and has ends shaped and oriented such that constant width air gaps exist between the secondary core 34 and the shaft 20. Application of torque to the shaft when current is passing through the primary coil 32 causes axial induction $B'_{axial}$ to arise and magnetic flux to pass through secondary core 34. Voltage is then produced in secondary coil 36 via Faraday's law and measured by voltmeter 38. This voltage is zero for zero applied torque and increases as torque increases; hence, the voltage is a direct measure of applied torque.

Limitations of Idealized Approach

FIG. 3 is a reproduction from SAE paper #870472 showing the spurious output signal variation measured by voltmeter 38 (see FIG. 2B) within each single revolution (mechanical cycle) of shaft 20.

This phenomenon is attributed to local variations in magnetic permeability and residual stress around the shaft circumference. The shaft material is not completely homogeneous either in its magnetic properties or in degree and distribution of residual stresses. As the shaft rotates, these non-uniformities pass under the sensor and alter the amount of flux transmitted through the sensor coils. The result is a non-torque dependent variation in the output voltage.

A second cause for spurious subcycle signal alteration is variation in air gap thickness between sensor and shaft due to (i) shaft misalignment and/or (ii) bending stresses in the shaft. Since the flux is also dependent on this gap thickness, if the gap thickness varies then so will the output voltage.

The standard solution to this problem has been to use a low pass filter to eliminate all signal variations with frequencies greater than that of one shaft revolution (one mechanical cycle.) Unfortunately, this introduces a time constant into the device which limits the measurement bandwidth to approximately $\frac{1}{2}$ the mechanical frequency and precludes measurement of torque changes more rapid than those occurring over several mechanical cycles. The resulting signal becomes an average rather than an instantaneous measure of torque and is hence limited to steady state or slow transient operations.

FIG. 4 is also a reproduction from SAE paper #870472 and illustrates a second problem encountered in prior art—the variation in output signal with RPM. Increasing the speed of rotation of the shaft 20 while torque remains constant increases the output signal. This is undesirable since the ideal signal should reflect change in torque alone. The common solution approach heretofore employed has been to monitor RPM and introduce a shaft speed dependent correction to the output signal detected by voltmeter 38. This has not been completely successful, eliminating some but not all of the error. Further, it has complicated the device by introducing additional measurement and apparata.

A third problem in prior art is temperature dependence. As the shaft temperature varies (a common phenomenon in automobile and many other engines), so does the output signal even as all other parameters remain constant. This is no doubt due in large part to (i) temperature induced variations in magnetic permeabilities of the shaft/sensor materials, (ii) concomitant modification in tolerances which affect the air gap dimension between sensor and shaft, and (iii) changes in resistivity of the wires used in the sensor. The typical prior art solution is to employ feedback from a thermocouple to further correct the output signal. As reported in SAE paper #870472 this also has had only some but not full success. This is presumably because different temperature gradation fields within the engine would affect the sensor/shaft differently yet could have the same temperature value for any given single point (i.e., the point at which the thermocouple might be located.)

Signal instability or drift over time is yet a further problem. During testing, the SAE paper #870472 researchers found it necessary to "null out" the zero torque signal anew each day.

In summary, several disadvantages of prior art magnetostrictive torque sensors are:
(a) Signal variation within one mechanical cycle prohibits accurate instantaneous torque measurement.
Average values over several cycles must be used. Causes are:
  (i) Local random variations in magnetic material properties
  (ii) Sinusoidal variation in air gap due to
    shaft misalignment
    bending stresses in shaft
(b) Signal drifts from day to day
(c) Output varies with RPM
(d) Output varies with temperature Analysis of Prior Art Limitations Faraday's law of electromagnetism, i.e., $$v = -N\frac{d\phi}{dt} = -NA\frac{dB}{dt} \quad (I)$$

where $\phi$ is magnetic flux and A is core cross sectional area, can be rewritten using the definition for inductance L of a coil/core, i.e., $$N\phi = Li \quad (II)$$

where N is number of coil windings and i is current in the coil.

Hence Faraday's law can be rewritten as $$v = -\frac{d(Li)}{dt} = -L\frac{di}{dt} - i\frac{dL}{dt}. \quad (III)$$

In virtually all electric circuit applications L is constant and the second term in the far right hand side of (III) above vanishes. In the present case, however, it does not vanish, and as is shown below, the second term gives rise to the phenomenon of output signal dependence on RPM depicted in FIG. 4.

Inductance L depends on magnetic permeability $\mu_{Fe}$ of the shaft, and permeability varies slightly in different places around the shaft circumference. This variation can be due to either (i) natural changes in the material grain structure, composition, etc. or (ii) residual stresses on the shaft surface from machining, forming, etc. (which change $\mu_{Fe}$ via magnetostriction.) Hence, as the shaft rotates, the sensor "sees" a varying inductance through which its flux must pass. The time derivative of L is therefore not zero and the second term in the far right hand side of (III) above becomes important, i.e., it makes a contribution to the output voltage. Further, since the time derivative reflects the rate of change of L, the time derivative increases in magnitude for increasing values of RPM. Hence, the RMS value of the second term in the right hand side of (III) increases with increasing rational speed of the shaft, whereas the RMS value of the first term alone does not.

It is the second term which is responsible for the heretofore unexplained variation in signal output with shaft RPM. In addition, as discussed previously, the second term is also partly responsible for the irregular variation in signal within one shaft revolution shown in FIG. 3.

Additionally, it is the second term which causes each individual shaft to have a different dependence on RPM, since each shaft has different local variations in residual stress and magnetic permeability. Hence correction methodologies such as those heretofore employed which attempt to correct for output signal dependence via preset feedback signal correction are not suitable for mass production. Further, the correction needed for each individual shaft will change with time as residual stresses relax and as temperature and stress alterations modify local permeability variations. Hence the heretofore used correction methodologies would become increasingly inaccurate over time and would need continual recalibration. This is impractical in most applications, but particularly so for automotive and other vehicle engines.

Conclusion: Local variations in permeability and residual stresses result in:
(a) Signal irregularities within one shaft revolution which must be "averaged out" over several cycles
(b) Increase in output signal with RPM.

Correction methodologies used heretofore are unsuitable for mass production and become increasingly inaccurate over time.

DETAILED DESCRIPTION OF THE INVENTION

Previous art has maintained a long held tradition in electromechanics. That is, it has used an electronic feedback loop to keep input current $i_p$ to primary coil 32 at a constant RMS value. The objective in doing this has been to keep primary core 30 flux $\phi_p$ at constant RMS (see(II).) The underlying assumption is that L, the inductance, remains constant. In the case of magnostrictive torque sensors, however, the inductance L does not remain constant, so flux $\phi_p$ varies even if $i_p$ remains fixed. This results in the spurious output voltage signal discussed in previous sections. The present invention, in different embodiments, involves alternative methodologies which solve this and other problems associated with prior art.

Embodiment 1

FIG. 5 depicts embodiment number one of the present invention. In embodiment number one, primary current $i_p$ amplitude or primary voltage amplitude may be kept constant. For the constant primary current $i_p$ amplitude local variation in magnetic permeability $\mu_{Fe}$ will be reflected in both the $B_{circ}$ and the $B_{axial}$ fields. Output voltage from secondary coil 36 depends on the time derivative of $B_{axial}$ (see (I).)

In FIG. 5 an auxiliary coil 52 around the primary core produces a voltage signal (measured by voltmeter 54) dependent on the time derivative of the primary $B_p$ field (i.e., on $\phi_p$). Both signals incorporate the local inhomogeneities in permeability magnitude, but only the output of the secondary includes changes due to torque induced stresses. Dividing the instantaneous secondary voltage produced by secondary coil 36 by the instantaneous auxiliary coil voltage measured by voltmeter 54 by means of signal divider 56 results in a signal measured by voltmeter 38 which is essentially free of variation due to inhomogeneity of permeability magnitude. The signal measured by voltmeter 38 nevertheless still depends directly on the applied stress in the shaft and is a good measure of instantaneous torque.

In practical application it may at times prove necessary to add a component to the circuit between voltmeter 54 and signal divider 56 which would convert instantaneous zero signal values (measured by voltmeter 54) to small finite values in order to preclude division by zero in signal divider 56.

Embodiment 2

Negligible resistance in primary coil 32 would result in the simplification of embodiment two shown in FIG. 6. With negligible primary coil 32 resistance $R_p$, voltage in the primary coil 32 itself can be used directly to divide into the voltage from the secondary coil 36, thereby eliminating the need for auxiliary coil 52 on the primary core.

In any and all embodiments, the primary core/coil 30/32 can be aligned axially instead of circumferentially and the secondary core/coil 34/36 can be aligned circumferentially instead of axially. Further, even though the device performs optimally when the secondary and primary core/coils 34/36 and 30/32 are at right angles to one another and when one of the coil/cores is axially aligned, they can in fact be at any angle with respect to one another and with respect to the shaft axis.

The auxiliary coil 52 is depicted as wrapped around primary core 30 and concentric with primary coil 32, but all that is essential to the proper working of any embodiment is that a significant portion of the flux in the primary flux path of the shaft 20 pass through auxiliary coil 52. Hence auxiliary coil 52 can be wrapped inside of, wrapped outside of, wound along with, located elsewhere on primary core 30 than, or placed in close proximity to primary coil 32; or located anywhere else so long as the signal obtained from auxiliary coil 52 or a function of that signal can be used as a meaningful input to signal divider 56.

Although FIGS. 5 and 6 and the above discussion relate to a division of the signal produced by secondary coil 36 by either the signal produced by auxiliary coil 52 or primary coil 32, the invention equally relates to a division of the signal produced by auxiliary coil 52 or primary coil 32 by the signal produced by the secondary coil 36. Further, the signals divided can be instantaneous, RMS, amplitude or any other indicator of signal strength.

The description of these embodiments contains many specificities, but the invention is not limited in scope by these specificities. The invention is primarily a method to minimize spurious signal components due to material inhomogeneities, temperature, and shaft speed by dividing two signals each of which contain similar such spurious signal components, but only one of which contains a torque dependent component. The invention, therefore, encompasses any method which accomplishes such a division.

Concomitant Solutions to Variation in RPM, Temperature, Drift Problems

Spurious permeability magnitude induced frequency components of the output voltage signal from secondary coil 36 are directly dependent on shaft speed. Via embodiment #1 or #2, such spurious frequency components are eliminated from the output signal measured by voltmeter 38 and dependence of the output signal of voltmeter 38 on shaft speed is minimized.

Both voltage signals entering signal divider 56 are affected by temperature and tolerance variation in similar ways and hence when the signals are divided, variation of the resulting signal measured by voltmeter 38 caused by temperature and tolerances is minimized.

Although drift in signal is not a serious problem since it can always by "nulled out" prior to measurement, it should be noted that drift is reduced as well. Drift affects both signals entering signal divider 56 in a similar way, and hence, when they are divided, effects from drift are minimized.

Embodiment 3

FIG. 7 illustrates a modification which eliminates spurious output signal caused by shaft bending stresses and/or shaft misalignment and which is applicable to any embodiment.

The inductance L is dependent on the air gap dimension. For shaft displacement from centerline due to slight misalignment or bending, the inductance L will change and hence so will the output signal (even for the embodiments presented above.) In addition, stresses from bending will affect permeability (magnetostriction again) and further alter the output. Both of these effects contribute erroneous components to the output signal which are sinusoidal with period equal to the time of one shaft revolution.

This problem can be ameliorated in either of two ways:
(1) Place sensor in an end or main bearing where no bending stress exists and misalignment can be minimized. (Note that though this is not specifically claimed as part of the invention described herein, the invention and any of its embodiments described herein can be used in any location along a shaft including the end or main bearing. The reader will understand that a specific location cannot be claimed as a patent right.)
(2) Use two sensors 66A and 66B on opposite sides of the shaft as in FIG. 7 and add the two (instantaneous) signals $v_A$ and $v_B$. For simplicity FIG. 7 is shown with zero applied torque although the method is applicable with torque of any magnitude.

Method (2) above works because the misalignment and bending stress signal aberrations are 180° out of phase and so cancel one another when added. This second method has the added advantage of doubling effective signal strength (i.e., the sensitivity).

Embodiment 4

Method (2) functions optimally when sensors 66A and 66B are on opposite sides of the shaft as shown by embodiment 3. The sensors can, however, have any angular relation to one another as long as proper phase corrections are made to one or both signals to correct for the variation from 180° angular spacing between sensors and such a correction methodology comprises embodiment 4. FIG. 8 depicts embodiment 4.

Note that embodiment three relates to any orientation of the sensors which is sufficiently close to 180° angular separation such that the sensor signals can be added directly without phase shifting to achieve a sufficiently accurate signal.

While the discussions of embodiments three and four relate to a single pair of sensors, any number of pairs may be employed. Alternatively, a group of more than two sensors could be used in which signals from all sensors are added to obtain a resultant signal free of misalignment and bending stress induced components. For example, signals from three sensors spaced 120° apart, or sufficiently close to 120°, could be directly summed. For spacing other than 120°, signal phase shifting can be done where necessary before summation.

Solutions to Mass Production and Recalibration Problems

The reader will note that the invention minimizes the effects of RPM dependence, temperature dependence, and non-instantaneous torque measurement in a simpler, more elegant, and more effective manner than do prior art cross design devices. At the same time the present invention offers practical options for mass production and elimination of the need for periodic recalibration during the lifetime of the shaft. It does this because unlike prior art, the correction methodologies of this invention are independent of particular properties (magnetic permeability magnitude, tolerance, and misalignment) of each particular shaft.

This is because, in embodiments one and two, the two signals entering signal divider 56 are both affected by shaft permeability magnitude in the same way, regardless of what that permeability may be in any given shaft. Hence the signal read by voltmeter 38 will not depend on variations from shaft to shaft or on changing of shaft properties over time.

Embodiments three and four are also amenable to mass production because they solve the misalignment and bending stress problems in a manner which is independent of individual shaft bending or misalignment. Changes in alignment and bending stress over time will also automatically be accounted for.

Advantages Over Prior Art

This invention can thus be seen to solve many of the problems associated with determination of torque in rotating shafts in a much more complete, accurate, simple, economic, and straightforward manner than any previous cross design sensor art.

While the above description contains many specificities, the reader should not construe these as limitation on the scope of the invention, but merely as exemplifications of preferred embodiments thereof. Those skilled in the art will envision many other possibilities that are within its scope. For example any of the embodiments can use any materials, including superconductors, for any components, and can have any dimensions or shapes. The air gaps can be of any dimensions and can even by of non-constant or non-uniform gap width. The shaft 20 can be rotating or stationary and of any suitable material, size, or shape. The shaft does not even have to be cylindrical and can have one or more strips of material attached to it which enhance the working of the invention. The strips can be of any suitable material including thin films and can be attached to any amount of the shaft.

Additionally, any number of coil windings can be used for any of the coils in any of the embodiments and the cores can have any suitable shape and size as well as be of any suitable material. The cores do not have to be ferromagnetic and can, if for instance the wires are superconducting, be made of air, any gas, any other material, or even a vacuum. Additionally, wherever one coil is indicated (such as, but not limited to, the primary coil) a plurality of coils could be employed. Also, whereas AC sinusoidal current is probably the most suitable for the invention, any wave form current/voltage can be used, even DC or a pulse with appropriate integration/differentiation. Wherever constant amplitude of any signal is referred to, any nearly constant amplitude signal which results in an acceptable measure of torque will suffice. Further, any signal does not have to be used directly but can be amplified or transformed in any manner and the resultant amplified or transformed signal can be used for the same or similar purpose as the original signal. Also, any signal (e.g. voltage) does not have to be measured directly, but can be determined indirectly via measurement of parameters which are related to such a signal (e.g.'s, measuring other voltages in a loop, measuring current when impedance is known, etc.) Of course, all arrangements where voltmeters with one side attached to ground measuring the non-grounded side of a circuit can equivalently be arranged where the same voltmeters measure voltage across the circuit with neither side grounded. The converse is true as well. Although the terms voltmeter and ammeter are used, any means to measure or determine voltage and amperage can be employed; and although terms such as oscillator and power amplifier are used, any devices which serve the same or similar purposes for them or any other system components can be employed as well. Further, the sensors can be located anywhere along the shaft axially, radially, or at the ends, in any number, and can even be used with a torque disk such as that described in U.S. Pat. No. 4,697,460 or other such appendage to the shaft. Also, any of the embodiments can be used separately or in combination in any degree with any of the others. Finally, the invention in any of its embodiments can also be used as a device to measure stress and strain, as in U.S. Pat. No. 2,912,642, and can even be used to measure force applied to any given object or objects. Accordingly, the scope of the invention should be determined not by the embodiments illustrated, but by the appended claims and their legal equivalents.

We claim:

1. A torque sensing apparatus comprising:
    a means for inducing a primary magnetic induction field flux in a torque transmitting element,
    a means for obtaining a primary signal which is a function of the primary magnetic induction field flux strength,
    a means for obtaining a secondary signal which is a function of the strength of a secondary magnetic induction field flux in said torque transmitting element whose secondary magnetic field direction arises at a nonzero angle from the primary magnetic induction field as a result of magnetostriction when torque is transmitted by the torque transmitting element, and
    a means for division of one of said signals by the other,
    whereby a resultant signal produced by said means for division is minimally affected by inhomogeneities in the torque transmitting element and said resultant signal is thereby used to determine the torque transmitted.

2. The torque sensing apparatus of claim 1 wherein the means for inducing the primary magnetic induction field flux comprises a primary coil of any number of turns, and
   the means for obtaining a primary signal which is a function of the primary magnetic induction field flux strength comprises an auxiliary coil through which a significant amount of the primary magnetic field flux passes and an associated auxiliary electric circuit comprising a means to determine an auxiliary circuit parameter such as, but not limited to, voltage across the auxiliary coil and use said auxiliary circuit parameter to yield the primary signal.

3. The torque sensing apparatus of claim 1 wherein the means for obtaining the secondary signal comprises a secondary coil of any number of turns and an associated secondary electric circuit comprising:
   a means to determine a secondary circuit parameter such as, but not limited to, the voltage across the secondary coil,
   whereby said secondary circuit parameter is used to determine the secondary signal.

4. The torque sensing apparatus of claim 1 wherein the means for inducing the primary magnetic induction field flux comprises:
   a primary coil of any number of turns
   and the means for obtaining a primary signal which is a function of the primary magnetic induction field flux strength comprises:
   an auxiliary coil through which a significant amount of the primary magnetic field flux passes and an associated auxiliary electric circuit comprising a means to determine an auxiliary circuit parameter such as, but not limited to, the voltage across the auxiliary coil and use said auxiliary circuit parameter to yield the primary signal,
   and the means for obtaining the secondary signal comprises:
   a secondary coil of any number of turns and an associated secondary electric circuit comprising a means to determine a secondary circuit parameter such as, but not limited to, voltage across the secondary coil,
   whereby said secondary circuit parameter is used to determine the secondary signal.

5. The torque sensing apparatus of claim 1 wherein the primary magnetic induction field flux is induced by a primary electric circuit and a primary coil of any number of turns and of such low electrical resistance that any means for determining a primary circuit parameter such as, but not limited to, voltage across said primary coil is a sufficiently accurate approximation to and a substitute for any means for determining an auxiliary circuit parameter such as, but not limited to, voltage across an auxiliary coil through which a significant amount of the primary magnetic field flux passes such that said primary circuit parameter can be used to yield a sufficiently accurate approximate primary signal.

6. The torque sensing apparatus of claim 5 wherein the means for obtaining the secondary signal comprises:
   a secondary coil of any number of turns and an associated secondary electric circuit comprising a means to determine a secondary circuit parameter such as, but not limited to, the voltage across the secondary coil,
   whereby said secondary circuit parameter is used to determine the secondary signal.

7. A misalignment signal correcting torque sensing apparatus comprising:
   a plurality of individual torque sensing apparata, each of which comprises the torque sensing apparatus of claim 1, situated at different locations with respect to the torque transmitting element, and having the individual torque sensing output signals of each of said plurality of individual torque sensing apparata combined,
   whereby a resultant signal of such combination is used to determine torque and the resultant signal is minimally affected by bending stress and misalignment of said torque transmitting element.

8. The misalignment signal correcting torque sensing apparatus of claim 7 wherein
   if the individual torque sensing apparata are deployed in any number of pairs such that if the two individual torque sensing apparata of any said pair are effectively on opposite sides of the torque transmitting element, then the individual torque sensing output signals of the two individual said sensors comprising one such pair are added to obtain the resultant signal and if the two individual torque sensing apparata of any said pair are not on opposite sides of the torque transmitting element, then the individual torque sensing output signals of the two individual torque sensing apparata comprising said pair are phase shifted and then added to obtain a resultant signal which is thereby minimally affected by bending stress and misalignment of the torque transmitting element and can be used to determine torque;
   and if the individual torque sensing apparata are deployed in any number of groups each group of which comprises any number of such individual torque sensing apparata, then the individual torque sensing output signal of each of the individual torque sensing apparata is, if needed, phase shifted, to determine a corrected individual torque sensing output signal, and then all such corrected individual torque sensing output signals are added to obtain a resultant signal which is thereby minimally affected by bending stress and misalignment of the torque transmitting element and can be used to determine torque.

9. The torque sensing apparatus of claim 1 wherein at least two of said apparata are located in different locations around the torque transmitting element wherein, if the angular spacings between said locations are effectively equal, the at least two resultant signals are added to obtain an enhanced signal; and if the angular spacings between said locations are not effectively equal, the at least two resultant signals are phase shifted and then added to obtain the enhanced signal,
   whereby said enhanced signal is used to determine torque, and said enhanced signal is minimally affected by bending stress and misalignment of the torque transmitting element.

10. A method for sensing torque in a torque transmitting element comprising:
   inducing a primary magnetic induction field flux in said torque transmitting element,
   obtaining a primary signal which is a function of the primary magnetic induction field flux strength,
   obtaining a secondary signal which is a function of a secondary magnetic induction field flux strength in said torque transmitting element whose secondary magnetic induction field direction arises at a non-zero angle from the primary magnetic induction field as a result of magnetostriction when torque is transmitted by the torque transmitting element, and dividing of one of said signals by the other said signal, whereby a resultant signal produced by said dividing is minimally affected by inhomogeneities in the torque transmitting element and said resultant signal is thereby used to determine the torque transmitted.

11. The method for sensing torque of claim 10 wherein said step of inducing is further characterized by:

the primary magnetic induction field flux being induced by at least one primary coil of any number of turns and of such low electrical resistance that the primary signal is a sufficiently accurate approximation to the auxiliary signal; and said step of dividing is further characterized by:

using the primary signal as the auxiliary signal and dividing one of said auxiliary signal and said secondary signal into the other.

12. The method for sensing torque of claim 10 wherein at least two of said methods are employed at different locations around the torque transmitting element wherein, if the angular spacings between said locations are effectively equal, the at least two resultant signals are added to obtain an enhanced signal; and if the angular spacings between said locations are not effectively equal, the at least two resultant signals are phase shifted and then added to obtain the enhanced signal, whereby said enhanced signal is used to determine torque, and said enhanced signal is minimally affected by bending stress and misalignment of the torque transmitting element.

* * * * *

UNITED STATES PATENT AND TRADEMARK OFFICE
CERTIFICATE OF CORRECTION

PATENT NO. : 4,979,399

DATED : December 25, 1990

INVENTOR(S) : Klauber et al.

It is certified that error appears in the above-identified patent and that said Letters Patent is hereby corrected as shown below:

TITLE PAGE:

Under References Cited, OTHER PUBLICATIONS, please delete "Monomura et al. JAE" and substitute --Nonomura et al. SAE-- therefor. Also please delete "*Acti-vators*" and substitute --*Activators*-- therefor. Also after the word "ASEA" please delete "Four" and substitute --Jour.-- therefor.

In Column 2, line 36, please delete "design" and substitute --designs-- therefor.

In Column 5, line 48, please delete "$B'_{axial}='sin\delta$" and substitute --$B'_{axial}=B'sin\delta$-- therefor.

In Column 8, line 1, please delete "rational" and substitute --rotational-- therefor.

UNITED STATES PATENT AND TRADEMARK OFFICE
CERTIFICATE OF CORRECTION

PATENT NO. : 4,979,399

DATED : December 25, 1990

INVENTOR(S) : Klauber et al

It is certified that error appears in the above-identified patent and that said Letters Patent is hereby corrected as shown below:

In column 11, line 55, please delete "by" and substitute --be-- therefor.

Signed and Sealed this

Eighth Day of September, 1992

Attest:

DOUGLAS B. COMER

Attesting Officer

Acting Commissioner of Patents and Trademarks